United States Patent [19]

Daniels

[11] Patent Number: 4,689,764

[45] Date of Patent: Aug. 25, 1987

[54] METHOD AND APPARATUS FOR FORMATTING A LINE OF TEXT CONTAINING A COMPLEX CHARACTER PRIOR TO TEXT JUSTIFICATION

[75] Inventor: Paul R. Daniels, Round Rock, Tex.

[73] Assignee: International Business Machines Corporation, Armonk, N.Y.

[21] Appl. No.: 842,072

[22] Filed: Mar. 19, 1986

Related U.S. Application Data

[63] Continuation of Ser. No. 666,129, Oct. 30, 1984, abandoned, which is a continuation of Ser. No. 315,029, Oct. 26, 1981, abandoned.

[51] Int. Cl.$^4$ ............................................. G06F 3/12
[52] U.S. Cl. ...................................... 364/900; 400/3; 400/17
[58] Field of Search .................. 400/1, 3, 9, 12, 22, 400/304, 309, 5, 17; 364/200 MS File, 900 MS File

[56] References Cited

U.S. PATENT DOCUMENTS

| | | | |
|---|---|---|---|
| 3,630,336 | 12/1971 | Johnson et al. | 400/17 |
| 3,757,921 | 9/1973 | Bishop | 400/12 X |
| 3,760,376 | 9/1973 | Tanner | 364/200 |
| 3,780,846 | 12/1973 | Kolpek et al. | 400/697.1 X |
| 3,812,945 | 5/1974 | Koplow et al. | 400/76 X |
| 4,114,750 | 9/1978 | Baeck et al. | 400/323 X |
| 4,286,889 | 9/1981 | Ebert et al. | 400/308 X |
| 4,298,290 | 11/1981 | Barnes et al. | 400/12 X |
| 4,348,738 | 9/1982 | Grier et al. | 364/900 |
| 4,381,553 | 4/1983 | Ferguson | 400/76 X |
| 4,397,572 | 8/1983 | Barnes et al. | 400/3 |

FOREIGN PATENT DOCUMENTS 2031626  4/1980  United Kingdom ............... 400/76

OTHER PUBLICATIONS

Tetiva TR, "Algorithmic Justification for a Printing Subsystem", IBM Technical Disclosure Bulletin vol. 21, No. 11, Apr. 1979, pp. 4642-4644.

*Primary Examiner*—Archie E. Williams, Jr.
*Assistant Examiner*—David L. Clark
*Attorney, Agent, or Firm*—J. B. Kraft; Thomas E. Tyson

[57] ABSTRACT

A word or text processing system has a bidirectional printer with formatting capability. A line of text is printed in one direction, and the printer is backspaced to form complex characters by adding overstrikes, such as underlining or accent marks. The formatting unit includes a storage mechanism for storing encoded space images, including variable width spaces, in a first scan pass. Space images overlapped by a backspace are deleted from the storage mechanism during the scan pass, and the number of spaces backspaced over is subtracted from the total count of expandable spaces available for justification. Upon detecting a space in the input data during the format pass, the system examines the space storage mechanism to determine if the image of the space is encoded therein. A space is expanded for line justification only if the space is encoded in the space storage mechanism.

7 Claims, 4 Drawing Figures

FIG. 2

BIT NUMBER

| Byte \ Bit | 7 | 6 | 5 | 4 | 3 | 2 | 1 | 0 |
|---|---|---|---|---|---|---|---|---|
| 0 | 7 | 6 | 5 | 4 | 3 | 2 | 1 | 0 |
| 1 | 15 | 14 | 13 | 12 | 11 | 10 | 9 | 8 |
| 2 | 23 | 22 | 21 | 20 | 19 | 18 | 17 | 16 |
| 3 | 31 | 30 | 29 | 28 | 27 | 26 | 25 | 24 |
| 4 | 39 | 38 | 37 | 36 | 35 | 34 | 33 | 32 |
| 5 | 47 | 46 | 45 | 44 | 43 | 42 | 41 | 40 |
| 6 | 55 | 54 | 53 | 52 | 51 | 50 | 49 | 48 |
| 7 | 63 | 62 | 61 | 60 | 59 | 58 | 57 | 56 |
| 8 | 71 | 70 | 69 | 68 | 67 | 66 | 65 | 64 |
| 9 | 79 | 78 | 77 | 76 | 75 | 74 | 73 | 72 |
| 10 | 87 | 86 | 85 | 84 | 83 | 82 | 81 | 80 |
| ⋮ | | | | | | | | |
| 141 | 1135 | 1134 | 1133 | 1132 | 1131 | 1130 | 1129 | 1128 |
| 142 | 1143 | 1142 | 1141 | 1140 | 1139 | 1138 | 1137 | 1136 |

BYTE NUMBER (rows) / EU'S FROM LEFT EDGE

METHOD AND APPARATUS FOR FORMATTING A LINE OF TEXT CONTAINING A COMPLEX CHARACTER PRIOR TO TEXT JUSTIFICATION

This is a continuation of application Ser. No. 666,129 filed Oct. 30, 1984 now abandoned, which is a continuation of application Ser. No. 315,029, filed Oct. 26, 1981 now abandoned.

BACKGROUND OF THE INVENTION

1. Field of the Invention

This invention relates to text or word processing systems, i.e., information processing systems where the processing affects the format of the information. More particularly, it relates to a method for justifying a line of text containing complex characters formed from backspaces and overstrikes.

2. Description of the Prior Art

Word or text processing systems have been developed for formatting alphanumeric data into a suitable format for specified printed documents, e.g., letters, reports, text books, magazines and newspapers. In previous word processing systems, substantially all of the formatting was accomplished in the word processor. A word processor normally comprises a keyboard entry display terminal, storage means, and a central processor. The operator utilizing the display terminal arranges the information into a preselected alphanumeric line and page format. The system then transmits the alphanumeric data, together with the formatting data, to the printer for outputting the previously formatted document. More recent word or text processing systems have sought new approaches to increase the output of the system. Improved word processing systems have included formatting capability in the printer so that the word processor would be released to carry out further word or text processing activities as the foreground task, while the printer could function simultaneously to complete its formatting functions as a background task.

Formatters in printers associated with word or text processors basically convert an input data stream containing controls and EBCDIC characters into an output data stream containing escape, print, and index commands. The formatter performs its task by operating on the input data stream in two passes, the scan pass and format pass. In the scan pass, a line of text from the input data stream is preprocessed through the calculation and storage of certain parameter values for later use in the format pass. In the output pass, printer control commands are generated from the line of text for buffering and subsequent transmission to the printer control system.

One of the functions performed by the text formatter of a printer is justification, or the uniform expansion of interword spaces for the purpose of eliminating all or some other specified percentage of the blank space between the right-most graphic in a field and the right boundary of the field. The calculations necessary to perform the justification process are made during the scan pass and stored until the format pass where the space expansion process is performed. The basic functions performed during the justification process are as follows: determining the number of expandable spaces in a field, calculating the amount of blank space to be eliminated, determining which spaces are to be expanded, and adding an appropriate escapement value to the escapement of the expandable spaces.

The printer of a text or word processing system forms a complex character in two passes of the printhead. In the first pass, the line or a section of the line is printed, then the printer is backspaced and the complex character is formed by overstrikes, such as by underlining or accent marks added to the printed character. However, such complex characters formed in two passes of a printhead have presented a problem with respect to line justification. Since line justification involves varying the interword space, any conventional justification technique would present a problem involving an interword space which was backspaced across in order to form the complex character. The result of ordinary line justification would be an offset between the character printed in the first pass and the overstrike printed in the second pass. A need has thus arisen for a line justification technique for use in combination with the formation of complex characters formed from two passes of the printhead.

SUMMARY OF THE INVENTION

The line justification technique of the present invention provides for line justification in a line of text including complex characters. The line justification method of the present invention includes encoding the image of any space encountered in the input during the scan pass and a means for storing the space image during the scan pass for later use in the format pass of the printer. The space images backspaced over during the scan pass are removed from storage, and the number of spaces backspaced over is subtracted from the total count of expandable spaces for justification. In the format pass, the space image storage mechanism is searched upon encountering a space in the input data, and the spaces in the input data are expanded only if they correspond to entries remaining in the storage mechanism. In this manner, justification is accomplished by using only those interword spaces in the line across which it was not necessary to backspace in order to form the complex character.

The line justification technique of the present invention includes means for providing justification for a line of text that includes proportional spacing and midline pitch changes. The implication of these text attributes are that a space may be partially backspaced over with the overlap being as small as one escapement unit, a single backspace may overlap more than one space, and the backspace need not be the same width as the space. If a backspace is detected in the scan pass of the input data stream, the space storage mechanism is examined at positions corresponding to the horizontal positions of the backspace to determine if any portion of a space or one or more spaces lie in the horizontal field of the backspace. In this manner any space within the horizontal field of the backspace is subtracted from the expandable space count, and the image of the space is deleted from the storage mechanism.

BRIEF DESCRIPTION OF THE DRAWINGS

For a more complete understanding of the present invention and further objects and advantages thereof, reference is now made to the following Detailed Description taken in conjunction with the accompanying Drawings, in which:

FIG. 2 is a drawing of the space image storage data structure;

DETAILED DESCRIPTION

Figure 1:
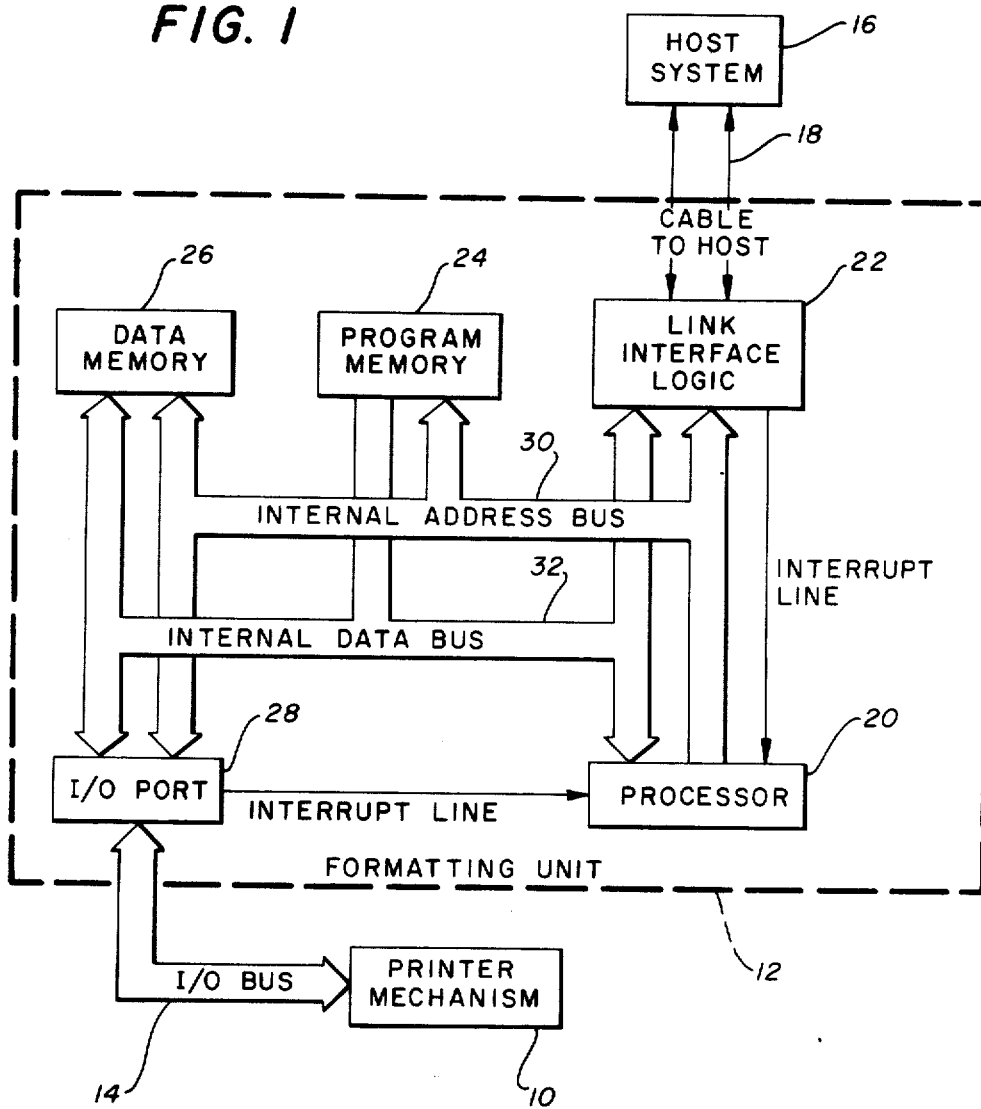
FIG. 1 is a diagrammatic representation of the logic and apparatus which may be used to carry out the line justification formatting of the present invention.

Referring to FIG. 1, a block diagram of a word or text processing system implementing the present invention is illustrated. The system includes a printer mechanism 10 which may be implemented by any conventional impact printer used in connection with word or text processing systems. The system also includes a formatting capability carried out in a formatting unit 12 connected to the printer 10 through an input/output bus 14. The formatting unit 12 is capable of carrying out the line justification function, as well as other formatting functions such as margin release and the setting of designated units for tabbing.

The formatting unit 12 is connected to a host system 16 over a cable 18. The host system 16 may be any standard word or text processing system, preferably one having a keyboard entry display. A typical word or text processing system which may be used is described in U.S. Pat. No. 4,417,322 issued Nov. 22, 1983 to R. E. Berry, et al., assigned to the assignee of the present invention. The formatting unit 12 enables the host system 16 to be freed from performing simple formatting functions, thereby permitting the whole system to carry out other functions more efficiently. The data transmitted over the cable 18 from host system 16 to the formatting unit 12 represents text character data to be printed on the printer mechanism 10 as a document in which data is already substantially formatted. The formatting unit 12 performs the additional formatting functions and transmits the final formatted information to the printer mechanism 10 over the input/output bus 14. The final formatted information will be utilized to control the printer 10 to produce the final document in the conventional manner.

The formatting unit 12 includes a digital signal processor 20 which may be implemented by a microprocessor controlling all of the operations carried out within the formatting unit 12. The formatting unit 12 also contains a data link interface logic unit 22 which functions as the interface between the host system 16 and the formatting unit 12. A program memory unit 24 stores the operational programs utilized by the processor 20 in carrying out the various formatting functions. A data memory unit 26 stores the formatted data, including that provided by the host system 16 as well as that provided by the formatting unit 12. An input/output port unit 28 operates in a conventional manner to serve as the interface between formatting unit 12 and the printer mechanism 10. The processor 20, link interface logic unit 22, program memory unit 24, data memory unit 26 and input/output port 28 of the formatting unit 12 are interconnected by an internal address bus 30 and an internal data bus 32.

Referring now to FIG. 2, a space storage mechanism 40 is constructed in memory with each bit in each byte corresponding to a location on the presentation surface which is a multiple of one escapement unit. The data structure of the storage mechanism 40 uses consecutive bytes of RAM memory with each byte accommodating eight escapement units of horizontal displacement. The low order bit (bit 0) of the low order byte (byte 0) represents the left edge of the presentation surface. Each higher order bit in the data structure represents a displacement of one escapement unit to the right on the presentation surface, where bit 0 of byte N'is considered the next higher order bit compared to bit 7 of byte N. The numbers of the squares inside the space storage mechanism 40 represent the number of escapement units from the left edge represented by that bit and byte number. For example, byte 2, bit 7 represents a horizontal position on the presentation surface, 23 escapement units from the left edge, and the next horizontal position to the right, 24 escapement units from the left edge, is represented by byte 3, bit 0.

A space in the input data stream is encoded in the storage mechanism 40 as a sequence of consecutive bits in ascending bit/byte order where the low order bit has a value of zero and the remaining bits have a value of one. The number of consecutive bits in sequence is a function of the number of escapement units comprising a space. As an example, the encoding method allows for spaces with four, five, or six escapement units corresponding to fifteen, twelve, and ten pitch character fonts. If the printer format utilizes a fifteen pitch character font, the space image is encoded in the storage data mechanism as four consecutive bits, a zero bit followed by three bits having the value of one. The location of the first zero valued bit corresponds to the horizontal position of the left edge of the space. The encoding of the left-most edge of the space provides a means for distinguishing between two or more consecutive spaces and a single long space. The absence of a space in any position is indicated by a sequence of two or more consecutive zero valued bits. Accordingly, if there are no space images in a line of input data, all bits in the space storage mechanism 40 would be set to zero. To illustrate the encoding of a space image in the space storage mechanism 40, a five escapement unit wide space located fourteen escapement units from the left edge would be encoded by placing a zero value in byte 1, bit 6 and ones in byte 1 bit 7 and byte two, bits 0, 1, and 2.

Figure 3:
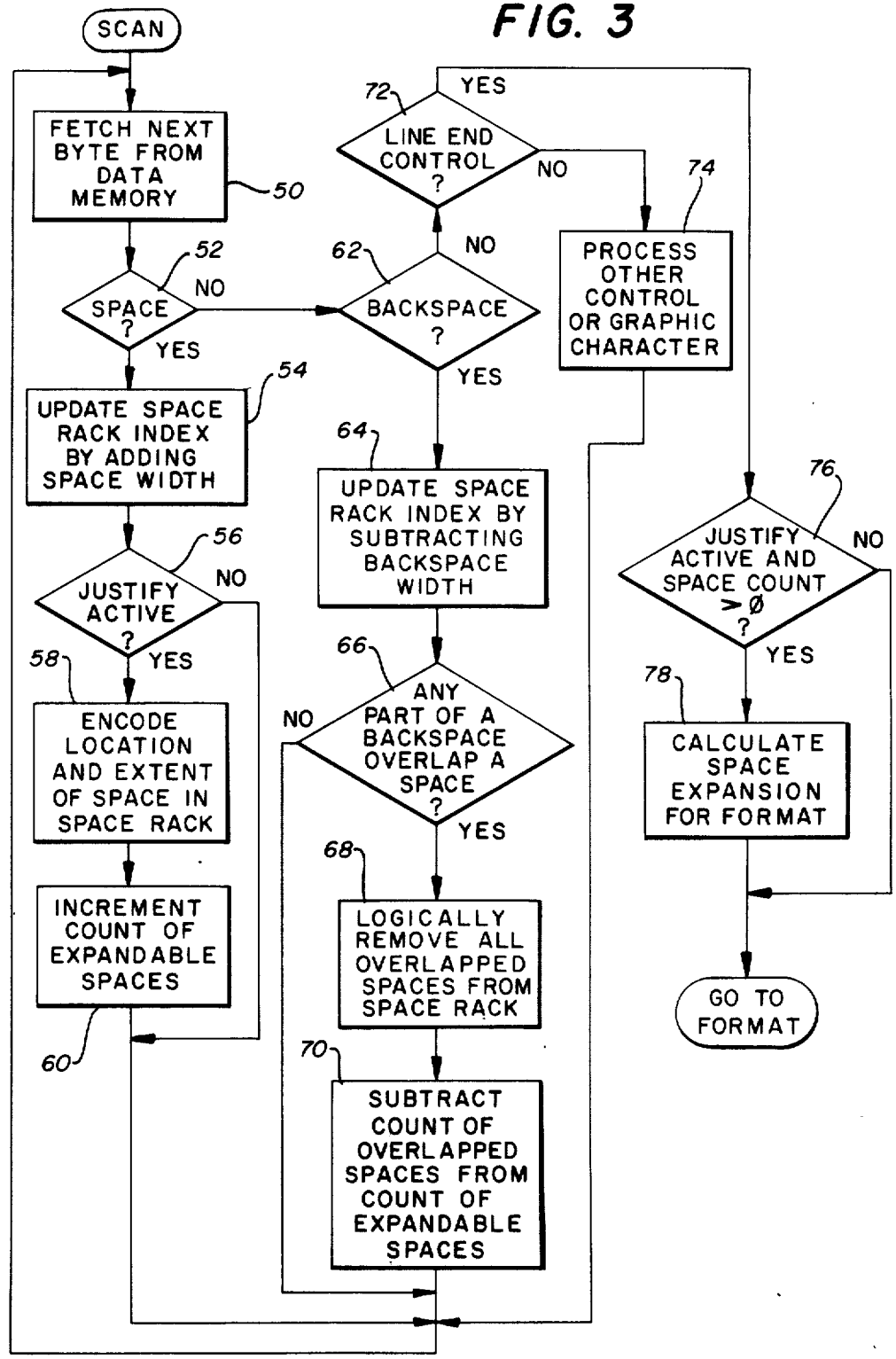
FIG. 3 is a flow chart diagram of the line scan process.

Referring now to FIG. 3, a flow chart illustrates the processing of an input stream of data during a scan pass. The scan subroutine first executes an instruction 50 to fetch the next byte from the data memory. The routine advances to inquiry 52 to determine if the byte represents a space. If a space is represented, the routine advances to step 54 to update the space rack index by adding the space width. The space rack index serves as a pointer into the space storage mechanism 40. The space width may vary with proportional spacing and midline pitch changes, eg., three, four, or five escapement units. The routine then advances to inquiry 56 to determine if the justification feature is active. If the justification feature is determined to be active, the subroutine advances to step 58 to encode the location and extent of the space in the space rack, the space storage mechanism 40. The routine then advances to step 60 to increment the count of expandable spaces for the justification process. The routine then returns to the initial instruction 50 to fetch the next byte from the data memory. If the inquiry 56 determines that justification is not active, the subroutine branches around steps 58 and 60, returning to instruction 50 to fetch the next byte from data memory.

If the scan routine at inquiry 52 determines that the next byte of data is not a space, it advances to inquiry 62 to determine if it is a backspace. If the byte is a backspace, the routine advances to instruction 64 to update the space rack index by subtracting the backspace width. The routine then advances to inquiry 66 to determine if any part of a backspace overlaps a space. If a backspace does not overlap a space, the routine branches to step 50 to fetch the next byte from data memory. However, if all or any part of a backspace overlaps a space, the routine advances to step 68 to logically remove all overlapped spaces from the space rack. The routine then advances to step 70 to subtract the count of overlapped spaces from the count of expandable spaces, and the routine is returned to step 50 to fetch the next byte of data.

If the backspace inquiry 62 determines that the byte from the data memory is not a backspace, the routine advances to inquiry 72 to determine if it represents a line end control. If it does not represent a line end control, the routine branches to step 74 to process other control or graphic character and returns the routine to fetch the next data from memory at instruction 50. If inquiry 72 indicates the data indicates a line end control, the routine branches to inquiry 76 to determine if the justification format feature is active and the space count is greater than zero. If both these conditions are met, the inquiry advances to program step 78 to calculate the space expansion for format, returning the program to the format routine following completion of the calculation. If the inquiry 66 determines that justification is not active or the space count is not greater than zero, then the routine branches to the format subroutine.

Figure 4:
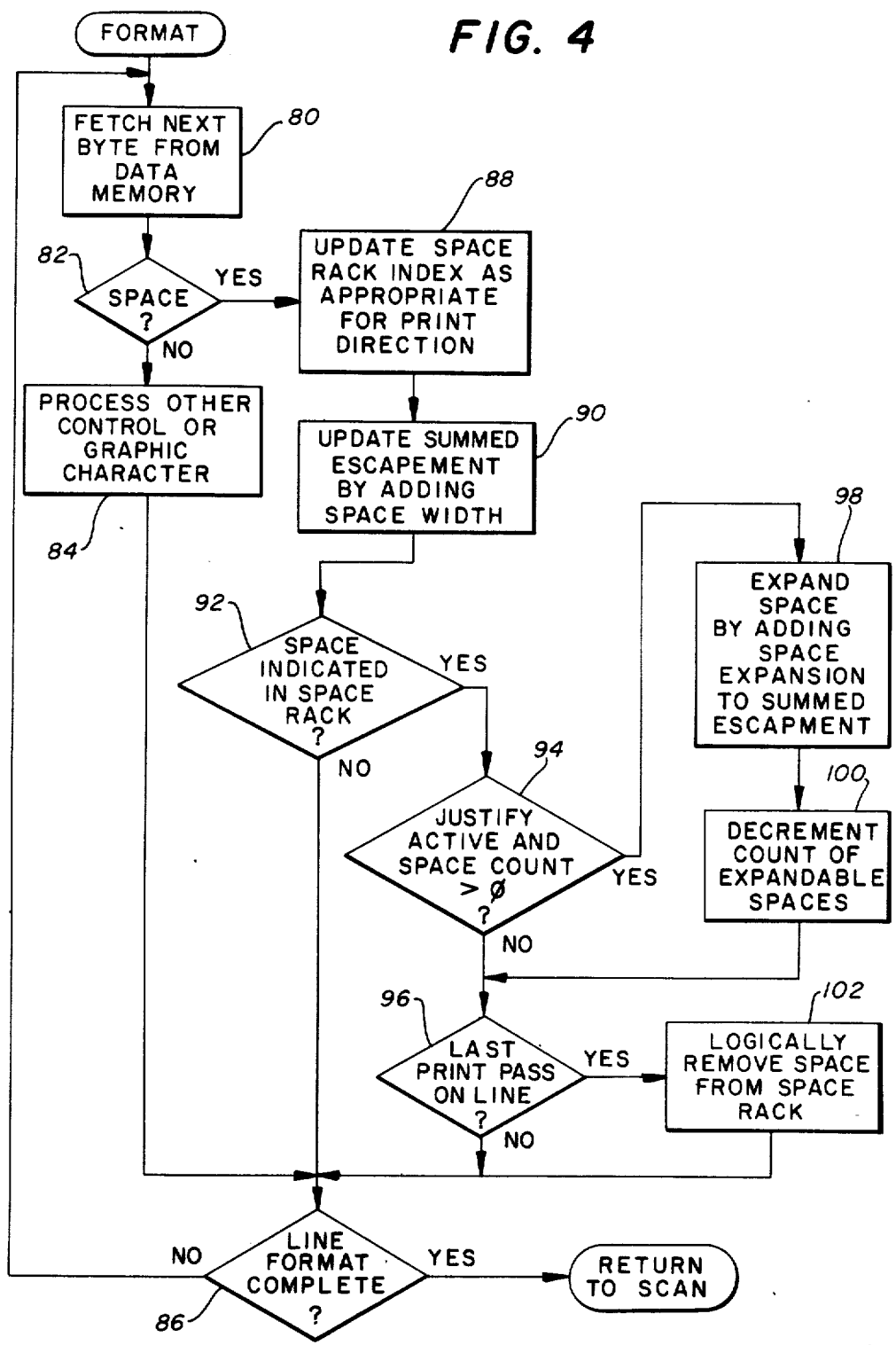
FIG. 4 is a flow chart diagram of the line format process.

Referring now to FIG. 4, the format subroutine is illustrated as a flow chart diagram. In the first step 80 of the routine an instruction is executed to fetch the next byte of data from memory. The routine then advances to inquiry 82 to determine if the data represents a space. If the byte of data does not represent a space, the routine advances to instruction 84 to process other control or graphic character. Following the processing of other control or graphic data, the program advances to inquiry 86 to determine if the line format is complete. If the line format is completed the program returns control to the scan routine, FIG. 3. If it is not complete, it returns to instruction 80 to fetch the next byte from data memory.

If the space inquiry 82 determines that the byte of data represents a space, it advances to instruction 88 to update the space rack index as appropriate for the print direction. The format routine then advances to instruction 90 to update the summed escapement by adding the space width. The routine advances to inquiry 92 to determine if the space is indicated in the space rack. If no space is indicated in the space rack, the routine advances to the line format complete inquiry 86. However, if a space is indicated in the space rack, the routine advances from inquiry 92 to inquiry 94 to determine if the justification format feature is active and the space count is greater than zero. If inquiry 94 is negative, the routine advances to a next inquiry 96 to determine if it is the last print pass on the line. If it is not the last print pass, the routine advances to inquiry 86 to determine if the line format is complete.

If the inquiry 94 determines that both the justification feature is active and the space count is greater than zero, the routine advances to execute instruction 98 to expand the space by adding the space expansion to the summed escapement. The routine executes instruction 100 to decrement the count of expandable spaces. The routine then returns to inquiry 96. If inquiry 96 indicates that it is the last print pass on the line, it advances to instruction 102 to logically remove the space from the space rack.

In operation, a line of text from the input data is preprocessed by the formatting unit 12 for later use in the format pass, where the line of text is converted into printer control commands. The printer control commands are buffered for subsequent transmission to the printer mechanism 10.

When an interword space is encountered in the input data stream in the scan pass, the location and extent of the space is encoded in the space storage mechanism 40. The stored location is the horizontal position where the space would lie along the print line without justification active. The extent of the space in storage would depend upon the pitch and could typically be four, five, or six escapement units.

When a backspace is encountered during the scan of input data, the space storage mechanism 40 is examined at locations corresponding to the horizontal positions of the backspace to determine if any portion of a space lies within the extent of the backspace. If any spaces lie within the extent of the backspace, the expandable space count for justification is decreased and the overlapped space images are deleted from the storage mechanism 40.

When a space is encountered in the format pass, the storage mechanism 40 is again examined. If the storage mechanism location corresponding to the print position if justification not active contains a space, the space is expanded as determined in the calculation in the scan pass (FIG. 3, step 78 of the scan routine). Upon reaching the last print pass on a line, all space images are removed from storage mechanism 40 so that it will not interfere with justification of the next line of text.

Although the preferred embodiments of the invention have been illustrated in the accompanying drawings and described in the foregoing Detailed Description, it will be understood that the invention is not limited to the preferred embodiments disclosed, but are capable of numerous rearrangements, modifications and substitution of parts and elements without departing from the spirit of the invention.

What is claimed is:

1. A method for formatting a line of text containing a complex character in a formatting unit including a memory, where the printing of the complex character requires a printer to traverse interword spaces by backspacing, the method comprising the steps of:

receiving data representing a text line to be printed, said data including a complex character;

establishing a space count representing a count of spaces available for subsequent justification of said text line;

evaluating the received data to determine a location and length of each interword space in said text line;

storing the location and length of each interword space in said text line in said memory;

incrementing the space count for each interword space in said text line;

evaluating said data to determine which stored interword spaces would be traversed by backspacing in order to print a complex character;

deleting from said memory the location and length of each interword space which was determined would be traversed by backspacing, and decrementing said space count for each so determined interword space;

adjusting the length of each interword space of said space count in said memory to justify the text line; and transmitting the text line data including the adjusted interword spaces for printing.

2. The method for formatting a line of text containing a complex character of claim 1 wherein said storing step includes the step of:

encoding location and length as a sequence of consecutive bits in said memory to represent varying length space widths in said data.

3. The method for fomatting a line of text containing a complex character of claim 1, wherein said storing step includes the step of:

encoding location and length as a sequence of consecutive bits in said memory to represent consecutive spaces in said data.

4. A text formatting system for formatting a line of text containing a complex character, where the printing of the complex character requires a printer to traverse interword spaces by backspacing, comprising:

means for receiving input data representing a line of text to be printed, said data including a complex character;

means for establishing a space count representing a count of spaces available for subsequent justification;

means responsive to the means for receiving input data for evaluating the received data to determine a location and length of each interword space in the input data;

means responsive to the means for evaluating the received data for encoding the location and length of the interword spaces in a data storage mechanism;

means responsive to the means for evaluating the received data for incrementing the space count representing available spaces by the length of each said encoded interword space;

means responsive to the means for receiving input data for evaluating the received data to determine which stored interword spaces would be traversed by backspacing in order to print a complex character;

means for deleting the location and length of each interword space from said storage mechanism which was determined would be traversed by backspacing;

means for decrementing said space count for each so determined interword space deleted from said data storage mechanism;

means for adjusting the length of each interword space of said space count in said data storage mechanism to justify the text line; and means for transmitting the text line data including the adjusted interword spaces for printing;

5. The text formatting system for formatting a line of text of claim 4, wherein said data storage mechanism is a random access memory means having each bit in each byte corresponding to one escapement unit along a print line, the lowest bit of byte N'being a higher order bit compared to the highest bit of byte N, said encoding means encoding said interword spaces as a sequence of consecutive bits in ascending bit/byte order.

6. A method for formatting a line of text containing a complex character in a formatting unit including a memory, where the printing of the complex character requires a printer to traverse interword spaces by backspacing, the method comprising the steps of:

receiving data representing a text line to be printed and including a plurality of characters and interword spaces and a complex character;

storing in said memory, locations and lengths of interword spaces which would not be traversed when backspacing to said complex character;

adjusting the length of each stored interword space to justify the text line; and transmitting the text line data for printing.

7. A text formatting system for formatting a line of text containing a complex character, where the printing of the complex character requires a printer to traverse interword spaces by backspacing, said system comprising:

means for receiving data representing a text line to be printed, said data including a plurality of characters and interword spaces and a complex character;

means for storing locations and lengths of interword spaces which would not be traversed when backspacing to said complex character;

means for adjusting the length of each stored interword space to justify the text line; and means for transmitting the text line data for printing.

* * * * *

UNITED STATES PATENT AND TRADEMARK OFFICE
CERTIFICATE OF CORRECTION

PATENT NO. : 4,689,764

DATED : August 25, 1987

INVENTOR(S) : Paul R. Daniels

It is certified that error appears in the above-identified patent and that said Letters Patent is hereby corrected as shown below:

Column 8, line 15, "N'being" should read --N+1 being--

Signed and Sealed this

Fourteenth Day of November, 1989

Attest:

JEFFREY M. SAMUELS

*Attesting Officer*    *Acting Commissioner of Patents and Trademarks*